United States Patent
Patel et al.

(10) Patent No.: US 10,110,487 B1
(45) Date of Patent: *Oct. 23, 2018

(54) SIGNALING PRIORITY INFORMATION FOR ENCAPSULATED PACKETS

(71) Applicant: Juniper Networks, Inc., Sunnyvale, CA (US)

(72) Inventors: Nayan S. Patel, Bedford, MA (US); Mahesh Narayanan, San Jose, CA (US); Vidur Gupta, Pleasanton, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/682,118

(22) Filed: Aug. 21, 2017

Related U.S. Application Data

(63) Continuation of application No. 14/585,181, filed on Dec. 29, 2014, now Pat. No. 9,742,672.

(51) Int. Cl.
*H04L 12/741* (2013.01)
*H04L 12/721* (2013.01)
*H04L 12/46* (2006.01)
*H04L 12/801* (2013.01)

(52) U.S. Cl.
CPC .......... *H04L 45/74* (2013.01); *H04L 12/4633* (2013.01); *H04L 45/66* (2013.01); *H04L 47/10* (2013.01)

(58) Field of Classification Search
CPC ..... H04L 45/74; H04L 12/4633; H04L 45/66; H04L 47/10
See application file for complete search history.

(56) References Cited

U.S. PATENT DOCUMENTS

| | | | |
|---|---|---|---|
| 7,639,696 B2 | 12/2009 | Wu | |
| 8,289,973 B2 | 10/2012 | DeiRegno et al. | |
| 8,442,030 B2 | 5/2013 | Dennison | |
| 9,489,119 B1 | 11/2016 | Smith, Jr. | |
| 9,704,498 B2 * | 7/2017 | Ma | G10L 19/038 |
| 9,742,672 B1 | 8/2017 | Patel et al. | |
| 9,881,626 B2 * | 1/2018 | Ma | G10L 19/038 |

(Continued)

OTHER PUBLICATIONS

Grossman, "New Terminology and Clarifications for Diffserv," RFC 3260, Network Working Group, Informational, Apr. 2002, 10 pp.

(Continued)

*Primary Examiner* — Mounir Moutaouakil
(74) *Attorney, Agent, or Firm* — Shumaker & Sieffert, P.A.

(57) ABSTRACT

In one example, an edge routing device of a service provider network includes one or more network interfaces configured to send and receive packets and a processing unit configured to retrieve, from a packet received via the one or more network interfaces, priority data from an Internet protocol (IP) header of the packet, form a first tag including a first set of data in a first priority field of the first tag, wherein the first set of data represents a first portion of the priority data, form a second tag including a second set of data in a second priority field of the second tag, wherein the second set of data represents a second portion of the priority data, encapsulate the packet with the first tag and the second tag, and forward, via the one or more network interfaces, the encapsulated packet.

18 Claims, 6 Drawing Sheets

(56) References Cited

U.S. PATENT DOCUMENTS

| | | | |
|---|---|---|---|
| 2005/0220107 A1 | 10/2005 | DeiRegno et al. | |
| 2007/0110028 A1 | 5/2007 | Wu | |
| 2008/0219268 A1 | 9/2008 | Dennison | |
| 2013/0317810 A1* | 11/2013 | Ma | G10L 19/038 |
| | | | 704/201 |
| 2015/0304174 A1 | 10/2015 | Zhao | |
| 2017/0221493 A1* | 8/2017 | Ma | G10L 19/008 |

OTHER PUBLICATIONS

Nichols et al., "Definition of the Differentiated Services Field (DS Field) in the IPv4 and IPv6 Headers," RFC 2474, Network Working Group, Standards Track, Dec. 1998, 20 pp.

Ramakrishnan et al., "The Addition of Explicit Congestion Notification (ECN) to IP," RFC 3168, Network Working Group, Standards Track, Sep. 2001, 63 pp.

"IEEE P802.1ah/D4.2—Draft Standard for Local and Metropolitan Area Networks, Virtual Bridged Local Area Networks—Amendment 6: Provider Backbone Bridges," The Institute of Electrical and Electronics Engineers, Inc., LAN/MAN Standards Committee of the IEEE Computer Society, Prepared by the Interworking Task Group of IEEE 802.1, Mar. 26, 2008, 116 pp.

"802.1Q 2003 Edition—IEEE Standards for Local and Metropolitan Area Networks, Virtual Bridged Local Area Networks," The Institute of Electrical and Electronics Engineers, Inc., IEEE Computer Society, Sponsored by the LAN/MAN Standards Committee, May 7, 2003, 326 pp.

Prosecution History from U.S. Appl. No. 14/585,181, dated Jan. 3, 2017 through Apr. 21, 2017, 28 pp.

* cited by examiner

SIGNALING PRIORITY INFORMATION FOR ENCAPSULATED PACKETS

This application is a continuation of U.S. application Ser. No. 14/585,181, filed Dec. 29, 2014, the entire contents of which is incorporated herein by reference

TECHNICAL FIELD

This disclosure relates to computer networks, and more particularly, service provider networks.

BACKGROUND

A computer network generally includes a number of interconnected network devices. In some cases, network devices utilize a service provider network to provide network services, e.g., to act as a backbone between customer sites and to support a virtual local area network (VLAN). Network devices of the service provider network may encapsulate packets with labels, such as VLAN tags, multi-protocol label switching (MPLS) labels, or other such labels, that include information regarding one or more services to be provided to customer packets.

SUMMARY

In general, this disclosure describes techniques for utilizing priority information (also referred to herein as quality-of-service (QoS) information) of a packet when providing a service to the packet. Network devices may assign priorities to packets. For example, Internet protocol (IP) headers include Differentiated Services Codepoint (DSCP) values that define priorities for corresponding packets. However, when such packets are encapsulated with a tag, e.g., with a VLAN tag, the IP header is generally not accessed, and therefore the DSCP data is not utilized. In some cases, conventional devices import part of the DSCP data into a priority field of a single tag, but VLAN tags and the like only include three-bit priority fields, whereas the DSCP data of an IP header has six bits. Therefore, in many cases, two packets with different DSCP data receive similar priority treatment within a service provider network. The techniques of this disclosure include providing all six bits of DSCP data in two tags or labels: an outer tag/label with three bits of priority information and an inner tag/label with the other three bits of priority information. As a result, network devices that switch based on inner and outer tags may provide fine-grained priority treatment to packets commensurate with the QoS resolution of the treatment provided to such packets by customer networks of the service provider network. The techniques may therefore facilitate the honoring of QoS profiles/service-level agreement (SLAs) for respective customers by the service provider.

In one example, a method includes retrieving, by a network device, priority data from an Internet protocol (IP) header of a packet, forming, by the network device, a first tag including a first set of data in a first priority field of the first tag, wherein the first set of data represents a first portion of the priority data, forming, by the network device, a second tag including a second set of data in a second priority field of the second tag, wherein the second set of data represents a second portion of the priority data, encapsulating, by the network device, the packet with the first tag and the second tag, and forwarding, by the network device, the encapsulated packet.

In another example, a method includes receiving, by a network device, an encapsulated packet comprising a first tag having a first priority field and a second tag having a second priority field, and forwarding, by the network device, the encapsulated packet based on the first priority field and the second priority field.

In another example, a method includes receiving, by a network device, a first encapsulated packet comprising a first tag and a second tag, receiving, by the network device, a second encapsulated packet comprising a third tag and a fourth tag, determining, by the network device, a first quality of service (QoS) for the first packet using a first priority field of the first tag and a second priority field of the second tag, determining, by the network device, a second QoS for the second packet using a third priority field of the third tag and a fourth priority field of the fourth tag, wherein the second QoS is lower than the first QoS, and based on the second QoS being lower than the first QoS, forwarding, by the network device, the first encapsulated packet before forwarding the second encapsulated packet.

In another example, an edge routing device of a service provider network includes one or more network interfaces configured to send and receive packets, and a processing unit configured to retrieve, from a packet received via the one or more network interfaces, priority data from an Internet protocol (IP) header of the packet, form a first tag including a first set of data in a first priority field of the first tag, wherein the first set of data represents a first portion of the priority data, form a second tag including a second set of data in a second priority field of the second tag, wherein the second set of data represents a second portion of the priority data, encapsulate the packet with the first tag and the second tag, and forward, via the one or more network interfaces, the encapsulated packet.

In another example, a core routing device of a service provider network includes one or more network interfaces configured to send and receive packets, and a processing unit configured to receive an encapsulated packet comprising a first tag having a first priority field and a second tag having a second priority field via the one or more network interfaces, and forward the encapsulated packet based on the first priority field and the second priority field via the one or more network interfaces.

In another example, a core routing device of a service provider network includes one or more network interfaces configured to send and receive packets, and a processing unit configured to receive a first encapsulated packet comprising a first tag and a second tag via the one or more network interfaces, receive a second encapsulated packet comprising a third tag and a fourth tag via the one or more network interfaces, determine a first quality of service (QoS) for the first packet using a first priority field of the first tag and a second priority field of the second tag, determine a second QoS for the second packet using a third priority field of the third tag and a fourth priority field of the fourth tag, wherein the second QoS is lower than the first QoS, and based on the second QoS being lower than the first QoS, forward the first encapsulated packet via the one or more network interfaces before the second encapsulated packet.

In another example, a system includes an edge router of a service provider network configured to retrieve priority data from an Internet protocol (IP) header of a packet, form a first tag including a first set of data in a first priority field of the first tag, wherein the first set of data represents a first portion of the priority data, form a second tag including a second set of data in a second priority field of the second tag, wherein the second set of data represents a second portion of the priority data, encapsulate the packet with the first tag and the second tag to form an encapsulated packet, and forward the encapsulated packet. The system also includes a core router of the service provider network configured to receive the encapsulated packet, and forward the encapsulated packet based on the first priority field and the second priority field.

In another example, a system includes an edge router of a service provider network configured to retrieve, from a first packet, first priority data from a first Internet protocol (IP) header of the first packet, form a first tag including a first set of data in a first priority field of the first tag, wherein the first set of data represents a first portion of the first priority data, form a second tag including a second set of data in a second priority field of the second tag, wherein the second set of data represents a second portion of the first priority data, encapsulate the first packet with the first tag and the second tag, and forward the first encapsulated packet, and retrieve, from a second packet, second priority data from a second IP header of the second packet, form a third tag including a third set of data in a third priority field of the third tag, wherein the third set of data represents a third portion of the second priority data, form a fourth tag including a fourth set of data in a fourth priority field of the fourth tag, wherein the fourth set of data represents a fourth portion of the second priority data, encapsulate the second packet with the third tag and the fourth tag, and forward the second encapsulated packet. The system further includes a core router of the service provider network configured to receive the first encapsulated packet, receive the second encapsulated packet, determine a first quality of service (QoS) for the first packet using the first priority field and the second priority field, determine a second QoS for the second packet using the third priority field and the second priority field, wherein the second QoS is lower than the first QoS, and based on the second QoS being lower than the first QoS, forward the first encapsulated packet before the second encapsulated packet.

In another example, a computer-readable medium, such as a computer-readable storage medium, contains, e.g., is encoded with, instructions that cause a programmable processor of an edge routing device to retrieve priority data from an Internet protocol (IP) header of a packet, form a first tag including a first set of data in a first priority field of the first tag, wherein the first set of data represents a first portion of the priority data, form a second tag including a second set of data in a second priority field of the second tag, wherein the second set of data represents a second portion of the priority data, encapsulate the packet with the first tag and the second tag, and forward the encapsulated packet.

In another example, a computer-readable medium, such as a computer-readable storage medium, contains, e.g., is encoded with, instructions that cause a programmable processor of a core routing device to receive an encapsulated packet comprising a first tag having a first priority field and a second tag having a second priority field, and forward the encapsulated packet based on the first priority field and the second priority field.

In another example, a computer-readable medium, such as a computer-readable storage medium, contains, e.g., is encoded with, instructions that cause a programmable processor of a core routing device to receive a first encapsulated packet comprising a first tag and a second tag, receive a second encapsulated packet comprising a third tag and a fourth tag, determine a first quality of service (QoS) for the first packet using a first priority field of the first tag and a second priority field of the second tag, determine a second QoS for the second packet using a third priority field of the third tag and a fourth priority field of the fourth tag, wherein the second QoS is lower than the first QoS, and based on the second QoS being lower than the first QoS, forward the first encapsulated packet before forwarding the second encapsulated packet.

The details of one or more examples are set forth in the accompanying drawings and the description below. Other features, objects, and advantages will be apparent from the description and drawings, and from the claims.

DETAILED DESCRIPTION

Figure 1:
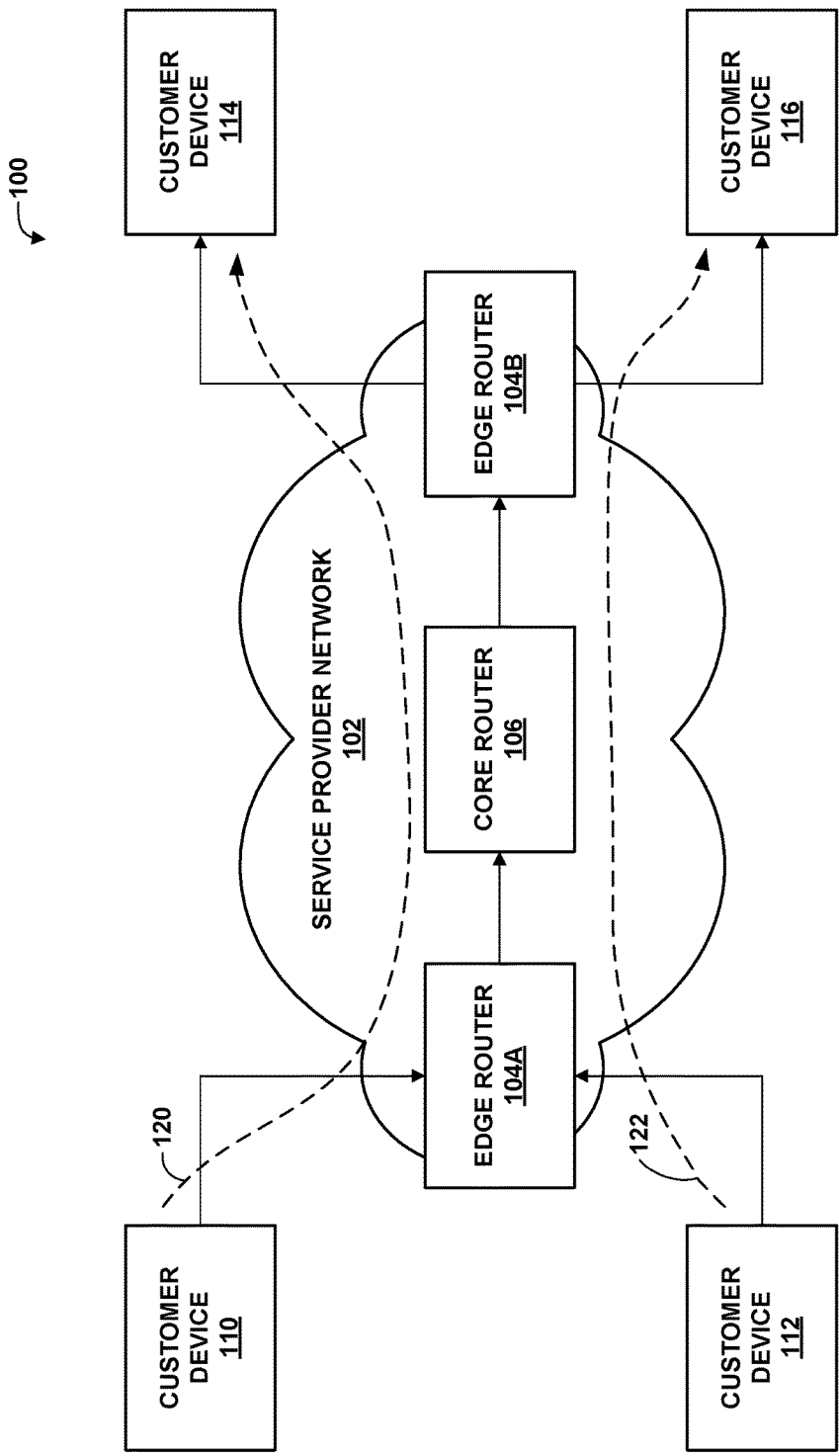
FIG. 1 is a block diagram illustrating an example network including a service provider network that provides services to customer devices.

FIG. 1 is a block diagram illustrating an example network 100 including a service provider network 102 that provides services to customer devices 110, 112, 114, 116. Such services may include, for example, virtual local area network (VLAN) or the like. In this example, customer device 110 sends a packet flow 120 to customer device 114 via service provider network 102, while customer device 112 sends a packet flow 122 to customer device 116 via service provider network 102.

Service provider network 102 includes edge routers 104A-104B (edge routers 104) and core router 106. Although only four routers are shown in FIG. 1, it should be understood that additional routers and/or other network devices (e.g., switches, bridges, hubs, network security devices such as firewalls, management devices, or the like) may be included. The four example routers of FIG. 1 are shown merely for ease of explanation.

Customer devices 110, 112 send packets to service provider network 102 via edge router 104A, in this example. Packets of packet flows 120, 122 include an Internet protocol (IP) header with a Differentiated Services (DS) field, e.g., according to Nichols et al., "Definition of the Differentiated Services Field (DS Field) in the IPv4 and IPv6 Headers," Network Working Group, RFC 2474, December, 1998. In general, the DS field includes six bits of data (the Differentiated Services Codepoint, (DSCP)) representing a priority (or quality-of-service (QoS)) for a packet. The DS field also includes two additional bits, which were undefined in RFC 2474 but were defined in Ramakrishnan et al., "The Addition of Explicit Congestion Notification (ECN) to IP," Network Working Group, RFC 3168, September, 2001, to represent ECN data.

The DSCP data of an IP header, that is, the six bits of priority information of the DS field of the IP header (also referred to as the "codepoint"), is generally used by network devices, such as routing devices, for priority queueing. As indicated in RFC 2474, DSCP data is used to determine a "per-hop behavior" (PHB) at each node along a network path. For instance, a value of "100000" may imply "mission critical traffic," whereas a value of "100011" may imply "best-effort traffic."

When routers of service provider network 102 provide a service to a packet flow, such as network tunneling for VLAN traffic, edge router 104A encapsulates a packet of the packet flow with a tag, e.g., a VLAN tag according to IEEE 802.1Q. Typically, two or more tags are used to encapsulate the packet: an outer tag that identifies a customer, and an inner tag that identifies services to be provided to a packet flow based on the customer identified in the outer tag. In this manner, core routers of service provider network 102, such as core router 106, may determine services to be applied to the packet based on the tags. For example, when providing a tunneling service, core router 106 may determine a next hop along the tunnel based on the tags. Accordingly, core routers can very quickly process such packets based on the tags, without inspecting encapsulated data (e.g., the IP header).

Most such tags, e.g., VLAN tags, IEEE 802.1ah tags, and the like, include three bits of priority information. In accordance with the techniques of this disclosure, edge router 104A is configured to include the full six bits of DSCP data from an IP header of a packet in the priority bits of two tags used to encapsulate the packet. That is, edge router 104A forms a first encapsulating tag with the first three DSCP bits of the IP header in the priority bits of the first encapsulating tag, and a second encapsulating tag with the last three DSCP bits of the IP header in the priority bits of the second encapsulating tag. Similarly, core router 106 is configured to inspect both sets of priority bits from both tags to determine priority for the packet.

For example, suppose a packet of packet flow 120 includes a DSCP value of "100000," which represents "mission critical traffic." Suppose further that a different packet of packet flow 122 includes a DSCP value of "100011," which represents "best effort traffic." Edge router 104A encapsulates the packet of packet flow 120 with two tags: one tag including "100" in its priority field, and another tag including "000" in its priority field. Edge router 104A also encapsulates the packet of packet flow 122 with two tags: one tag including "100" in its priority field, and another tag including "011" in its priority field.

Suppose that core router 106 receives these two packets within a short period of time, such that these two packets are processed at substantially the same time. Core router 106 may determine the priority for the packets of packet flows 120, 122 from the priority fields of the two tags. In particular, in accordance with the techniques of this disclosure, core router 106 may concatenate the priority values from the two priority fields to determine the full six bits of priority information: "100000" for the packet of packet flow 120 and "100011" for the packet of packet flow 122. Core router 106 may then compare the priorities to determine which of the two packets should be output first. In this example, core router 106 may determine that the packet of packet flow 120 should be output before the packet of packet flow 122. Consequently, core router 106 may output the packet of packet flow 120 before outputting the packet of packet flow 122, based on the priority. In this manner, core router 106 may take advantage of the full amount of DSCP data for the two packets using only data from the tags that encapsulate the packets, that is, without inspecting the DS field of the IP header. Thus, core router 106 may quickly process packets using tags that encapsulate the packets, while still providing a requested priority for the packets.

After core router 106 forwards the packets, edge router 104B receives the packets, in this example. Edge router 104B decapsulates the packets (that is, removes the tags added by 104A), and forwards the packets to their respective destinations, e.g., based on the IP headers of the packets, which include information such as respective destination IP addresses and ports. In this example, edge router 104B forwards packets of packet flow 120 to customer device 114 and packets of packet flow 122 to customer device 116. In other examples, a penultimate router (e.g., core router 106 in the example of FIG. 1) of service provider network 102 may be configured to decapsulate the packets prior to forwarding to edge router 104B.

Figure 2:
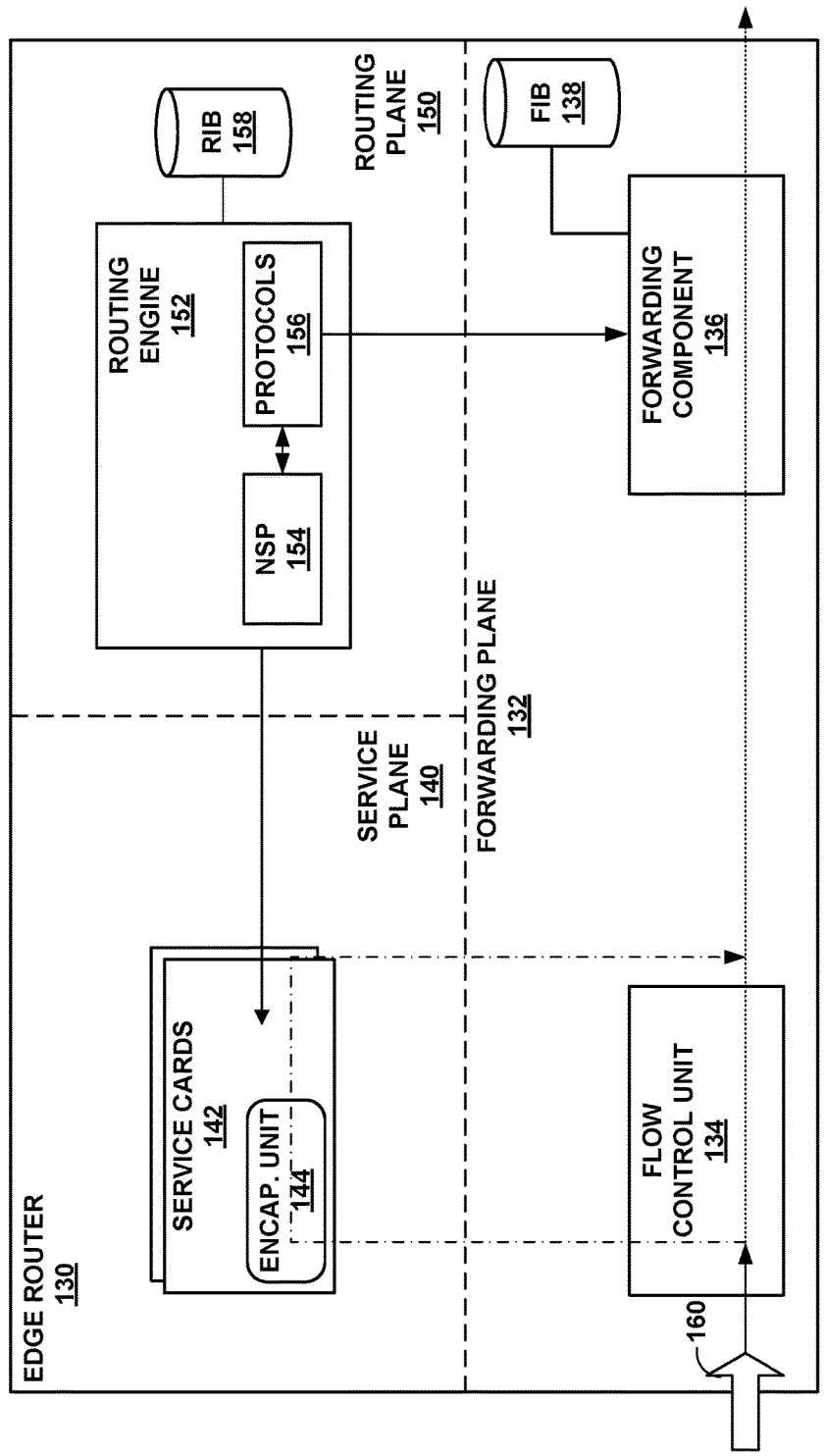
FIG. 2 is a block diagram illustrating an example arrangement of components of an edge router.

FIG. 2 is a block diagram illustrating an example arrangement of components of an edge router 130. Edge routers 104A, 104B (FIG. 1) may include components substantially similar to those of edge router 130. Similarly, core router 106 (FIG. 1) may also include similar components to those of edge router 130, absent encapsulation unit 144.

In the example of FIG. 2, edge router 130 is conceptually partitioned into distinct planes: forwarding plane 132, service plane 140, and routing plane 150. The functionality attributed to these various planes may be realized in common hardware, software, and/or firmware. The distinct planes are illustrated for purposes of explanation only. It should be understood that when these techniques are implemented in software or firmware, requisite hardware, such as a memory to store instructions for the software/firmware and processing unit to process the instructions, would also be provided.

In this example, forwarding plane 132 includes flow control unit 134, forwarding component 136, and forwarding information base (FIB) 138. Service plane 140 includes service cards 142, which include encapsulation unit 144. Routing plane 150 includes routing engine 152, which includes network services process (NSP) 154 and protocols 156, as well as routing information base (RIB) 158. NSP 154 communicates with and programs service cards 142 of service plane 140. In response, NSP 154 programs services cards 142 with corresponding configuration data, causing the service cards of service plane 140 to perform the functions described herein when processing packets redirected from forwarding plane 132.

In general, routing engine 152 executes various protocols 156, which include routing protocols, to discover network routes, e.g., routes through service provider network 102 (FIG. 1) and to devices external to service provider network 102 (e.g., customer devices 114, 116 of FIG. 1). Such protocols include border gateway protocol (BGP), interior services to interior services (IS-IS), open shortest path first (OSPF), interior gateway routing protocol (IGRP), enhanced IGRP (EIGRP), and the like. In response to discovering a route to a network destination, routing engine 152 stores the route in RIB 158. Routing engine 152 further determines a port (not shown) of edge router 130 that is connected to a "next hop" along the route, and may program FIB 138 to cause forwarding component 136 to direct traffic that is to be sent along the route to the next hop, as explained below.

In addition, protocols 156 may include protocols related to tags and/or labels, such as label distribution protocol (LDP), resource reservation protocol (RSVP), RSVP traffic engineering (RSVP-TE), or the like. In general, such protocols may be used to establish tunnels through service provider network 102. For example, these protocols may cause routers throughout service provider network 102 to determine tags (VLAN tags, IEEE 802.1ah tags, or the like) to use to forward packets to a particular destination. Routing engine 152 may provide data for such determined tags to encapsulation unit 144.

Encapsulation unit 144 is configured to encapsulate packets with tags, e.g., VLAN tags, IEEE 802.1ah tags, or the like. When encapsulation unit 144 receives a packet, encapsulation unit 144 determines a destination of the packet and encapsulates the packet with tags to reach that destination. In accordance with the techniques of this disclosure, encapsulation unit 144 is further configured to add priority information from a DS field of an IP header of the packet to priority fields of tags used to encapsulate the packet.

More particularly, when encapsulation unit 144 receives a packet, encapsulation unit 144 determines DSCP data for the packet from the DS field of the IP header of the packet. The DSCP data includes six bits. Encapsulation unit 144 partitions the DSCP data into two sets of three bits, and includes the first set of three bits in a first tag used to encapsulate the packet and the second set of three bits in a second tag used to encapsulate the packet. In this manner, when the first set of three bits and the second set of three bits are concatenated, the concatenation yields the original DSCP data for the packet. In this manner, the DSCP codepoint can be determined from the two tags used to encapsulate the packet, rather than from the IP header of the packet.

Flow control unit 134 is configured to receive packets and determine whether to send the packets directly to forwarding component 136 or to service cards 142 of service plane 140. In this manner, two "paths" exist through edge router 130: a "fast path" and a "slow path." The fast path generally bypasses service plane 140, whereas the slow path provides one or more services to the packets. Assuming that packet flow 160 is associated with a customer who has requested a service such as VLAN, flow control unit 134 is configured to direct packets of packet flow 160 to service cards 142. In this manner, flow control unit 134 sends packets of packet flow 160 to encapsulation unit 144 to be encapsulated, e.g., according to the techniques of this disclosure and as explained above. After encapsulation unit 144 encapsulates the packets (including addition of DSCP data into the priority fields of two or more tags used to encapsulate the packets), encapsulation unit 144 may either direct the packet to another one of service cards 142 or back to forwarding plane 132, where the packet is sent to forwarding component 136.

Forwarding component 136 queries FIB 138 with packet forwarding information of a packet to determine a physical port (not shown) of edge router 130 by which to send the packet. For instance, if the packet is unencapsulated, forwarding component 136 may determine a destination IP address (or destination IP subnet) for the packet, query FIB 138 with the IP address/subnet, and determine a physical port to which the IP address/subnet is mapped. Alternatively, if the packet is encapsulated, forwarding component 136 may determine a tag of the packet, query FIB 138 with data of the tag, and determine a physical port to which the data of the tag is mapped. Then forwarding component 136 forwards the packet via the determined physical port.

Moreover, forwarding component 136 may include a plurality of output queues (not shown). The queues may be arranged in terms of priority, e.g., highest to lowest. Forwarding component 136 may add a packet to one of the queues based on priority for the packet. For instance, if the packet is unencapsulated, forwarding component 136 may add the packet to one of the queues based on DSCP data of the packet. Alternatively, if the packet is encapsulated according to the techniques of this disclosure (e.g., with two or more tags), forwarding component 136 may add the packet to one of the queues based on a concatenation of priority fields from two of the tags.

Forwarding component 136 may forward packets by emptying the queues in order of priority for the queues. For instance, forwarding component 136 may dequeuer packets from the highest priority queue and forward these packets, and if this queue is empty, dequeuer and send a packet from a next highest priority queue, and so on. In this manner, packets having relatively high priorities may be forwarded before packets with relatively lower priorities.

The various functional units of edge router 130, including routing engine 152, service cards 142, encapsulation unit 144, flow control unit 134, and forwarding component 136, may be implemented in hardware, software, firmware, or a combination thereof. When implemented in software or firmware, it is presumed that requisite hardware (such as a memory and one or more hardware processing units) are also provided. The hardware may be a single processing unit or any combination of various processing units, such as microprocessors, application-specific integrated circuits (ASICs), digital signal processors (DSPs), field-programmable gate arrays (FPGAs), or any other such processing circuitry. The term "processing unit" should be understood to include a single hardware element or any combination of hardware elements.

In this manner, edge router 130 represents an example of an edge router including one or more network interfaces configured to send and receive packets and a processing unit. The processing unit is configured to retrieve, from a packet received via the one or more network interfaces, priority data from an Internet protocol (IP) header of the packet, form a first tag including a first set of data in a first priority field of the first tag, wherein the first set of data represents a first portion of the priority data, form a second tag including a second set of data in a second priority field of the second tag, wherein the second set of data represents a second portion of the priority data, encapsulate the packet with the first tag and the second tag, and forward, via the one or more network interfaces, the encapsulated packet.

As noted above, a core router may include components that are substantially similar to those of edge router 130 of FIG. 2. For example, core router 106 may include a forwarding component substantially similar to forwarding component 136. If two packets have different DSCP values and the two packets are encapsulated with two or more tags, two of the tags may include three bits worth of DSCP data for the packets, and core router 106 may determine priority data for the packets from the respective tags that encapsulate the packets. Accordingly, core router 106 may place these packets in different queues of the forwarding component based on the priority data determined from the encapsulating tags for the packets.

Thus, core router 106 represents an example of a core router including one or more network interfaces configured to send and receive packets, and a processing unit. The processing unit is configured to receive a first encapsulated packet comprising a first tag and a second tag via the one or more network interfaces, receive a second encapsulated packet comprising a third tag and a fourth tag via the one or more network interfaces, determine a first quality of service (QoS) for the first packet using a first priority field of the first tag and a second priority field of the second tag, determine a second QoS for the second packet using a third priority field of the third tag and a fourth priority field of the fourth tag, wherein the second QoS is lower than the first QoS, and based on the second QoS being lower than the first QoS, forward the first encapsulated packet via the one or more network interfaces before the second encapsulated packet.

Figure 3:
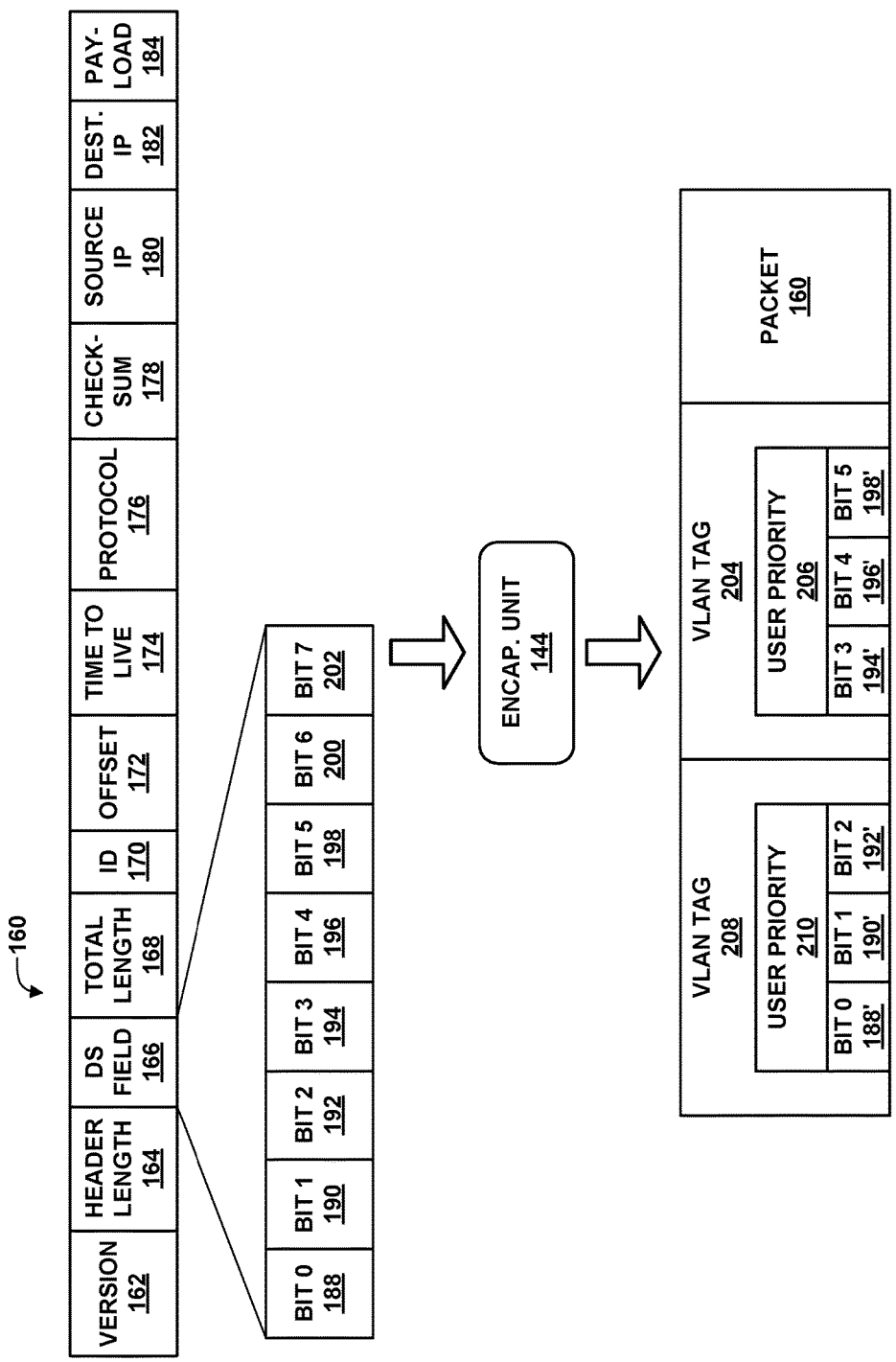
FIG. 3 is a conceptual diagram illustrating an example in which encapsulation unit encapsulates a packet in accordance with the techniques of this disclosure.

FIG. 3 is a conceptual diagram illustrating an example in which encapsulation unit 144 encapsulates packet 160 in accordance with the techniques of this disclosure. In this example, packet 160 includes an IP header, including version 162, leader length 164, DS field 166, total length 168, identifier (ID) 170, offset 172, time to live 174, protocol 176, checksum 178, source IP address 180, and destination IP address 182. Packet 160 also includes payload 184, which includes data at higher network layers.

Version field 152 has a value representing an IP version to which the IP header conforms. For instance, the value of version field 152 may indicate whether the IP header conforms to IPv4 or IPv6. Version field 152 includes four bits, in the example of IPv4. In the example of FIG. 3, the IP header is an IPv4 header.

Header length 154 has a value that describes a length of the header, including the data fields indicated above. Header length 154 may include four bits that describe the total length of the IP header, e.g., as the number of 32 bit words in the header.

DS field 166 includes eight bits 188-202, as further illustrated in FIG. 3. The first six bits (bit 0 188, bit 1 190, bit 2 192, bit 3 194, bit 4 196, and bit 5 198) represent individual binary bits forming a DSCP value, while bit 6 200 and bit 7 202 form ECN data. The ECN data generally provides an indication of network congestion to prevent dropped packets.

Total length field 168 has a value that describes a total length of packet 160, e.g., in bytes. The total length includes both the IP header and payload 184.

ID field 170 has a value representing a unique identifier for a group of fragments of an IP datagram.

Offset field 172 has a value describing a location of a fragment of packet 160.

Time to live field 174 has a value that is generally decremented each time packet 160 is forwarded. If the value of time to live field 174 reaches zero or a negative number, a device causing such a value may send an ICMP time exceeded message to the source device for packet 160 (e.g., identified by the value of source IP address 180).

Protocol field 176 has a value representing a protocol for packet 106.

Checksum field 178 represents a checksum for packet 160. The checksum may be used to detect, and possibly correct, errors in the packet.

Source IP field 180 has a value representing the IP address of the source of packet 160, that is, the device that initially sent packet 160.

Destination IP field 182 has a value representing the IP address of the destination of packet 160, that is, the device to which packet 160 is being sent.

In this example, packet 160 is sent to encapsulation unit 144, to be encapsulated for transmission through service provider network 102 (FIG. 1). In particular, in this example, encapsulation unit 144 encapsulates packet 160 with two VLAN tags: VLAN tag 204 and VLAN tag 208. In accordance with the techniques of this disclosure, encapsulation unit 144 forms VLAN tag 204 to include user priority field 206 including bit 3 194', bit 4 196', and bit 5 198', with values equal to, respectively, bit 3 194, bit 4 196, and bit 5 198 of the DSCP data of DS field 166. Likewise, encapsulation unit 144 forms VLAN tag 208 to include user priority field 210 including bit 0 188', bit 1 190', and bit 2 192', with values equal to, respectively, bit 0 188, bit 1 190, and bit 2 192 from the DSCP data of DS field 166. User priority fields 206, 210 may represent respective priority code point (PCP) fields of VLAN tags 204, 208.

In other examples, encapsulation unit 144 may form the VLAN tags to have user priority data corresponding to the DSCP data of DS field 166 in any of a variety of arrangements. For instance, VLAN tag 204 may include data for bit 0 188, bit 1 190, and bit 2 192, while VLAN tag 208 may include data for bit 3 194, bit 4 196, and bit 5 198. As another example, if the DSCP data of DS field 166 is stored to different bits of the DS field 166 than those described above, then VLAN tags 204, 206 may include data drawn from these bits.

Although not shown in FIG. 3 for brevity, VLAN tags 204, 208 would also include the other fields typically included in a VLAN tag, i.e., a tag protocol identifier (TPID), a drop eligible indicator (DEI), and a VLAN identifier. Moreover, encapsulation unit 144 may insert VLAN tags 204, 208 within an Ethernet frame including a preamble field, a destination media access control (MAC) address, a source MAC address, and an EtherType/size field.

While FIG. 3 illustrates an example in which encapsulation unit 144 encapsulates packet 160 with a VLAN tag, it should be understood that in other examples, encapsulation unit 144 may encapsulate a packet with other types of tags. For instance, encapsulation unit 144 may encapsulate packet 160 with B-tags and/or I-tags of IEEE 802.1ah, which similarly include three-bit priority fields that may be used to store DSCP data in accordance with the techniques of this disclosure. That is, two or more B-tags and/or I-tags, which encapsulate the packet, may store a copy of the totality of the DSCP data of the DS field of the IP header, and switching devices of the IEEE 802.1ah network may use the DSCP data stored to the B-tags and/or I-tags to provide differential priority treatment to corresponding packets, as described herein within respect to inner and outer VLAN tags generally.

Figure 4:
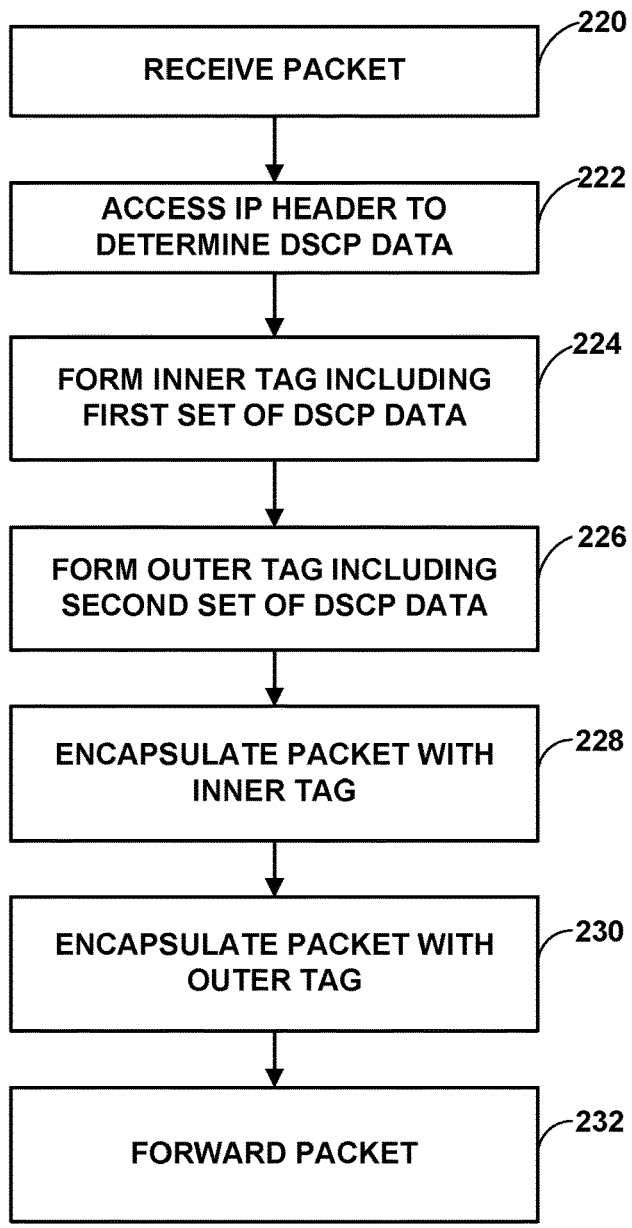
FIG. 4 is a flowchart illustrating an example method for encapsulating a packet in accordance with the techniques of this disclosure.

FIG. 4 is a flowchart illustrating an example method for encapsulating a packet in accordance with the techniques of this disclosure. The method of FIG. 4 is described, for purposes of example, with respect to edge router 104A of FIG. 1. However, it should be understood that other devices (e.g., edge router 130 of FIG. 2) may be configured to perform this or a similar method.

Initially, edge router 104A receives a packet (220). In particular, edge router 104A receives a packet from a customer device external to service provider network 102, e.g., one of customer device 110, 112. Edge router 104A then accesses an IP header of the packet to determine DSCP data for the packet (222). As noted above, the IP header includes an eight bit DS field, six bits of which represent the DSCP data.

In accordance with the techniques of this disclosure, edge router 104A forms an inner tag including a first set of DSCP data from the DS field of the IP header (224). For example, edge router 104A may copy the value of three of the bits of the DSCP data of the DS field of the IP header into a user priority field of the inner tag, such as a VLAN tag. Similarly, edge router 104A forms an outer tag including a second set of DSCP data from the DSCP field of the IP header (226). In this manner, when concatenated, the user priority fields of the inner and outer tags form the full DSCP data of the DS field of the IP header, e.g., as shown in FIG. 3.

Edge router 104A then encapsulates the packet with the inner tag (228) and encapsulates the packet with the outer tag (230). Edge router 104A then forwards the packet (232), e.g., to a core router of service provider network 102. When forwarding the packet, edge router 104A may prioritize the packet according to the priority information of the outer and inner tags and/or the DSCP data. For instance, edge router 104A may enqueue the packet in one of a plurality of queues based on the priority. The queues may be arranged in order of priority.

In this manner, the method of FIG. 4 represents an example of a method including retrieving, by a network device, priority data from an Internet protocol (IP) header of a packet, forming, by the network device, a first tag including a first set of data in a first priority field of the first tag, wherein the first set of data represents a first portion of the priority data, forming, by the network device, a second tag including a second set of data in a second priority field of the second tag, wherein the second set of data represents a second portion of the priority data, encapsulating, by the network device, the packet with the first tag and the second tag, and forwarding, by the network device, the encapsulated packet.

Figure 5:
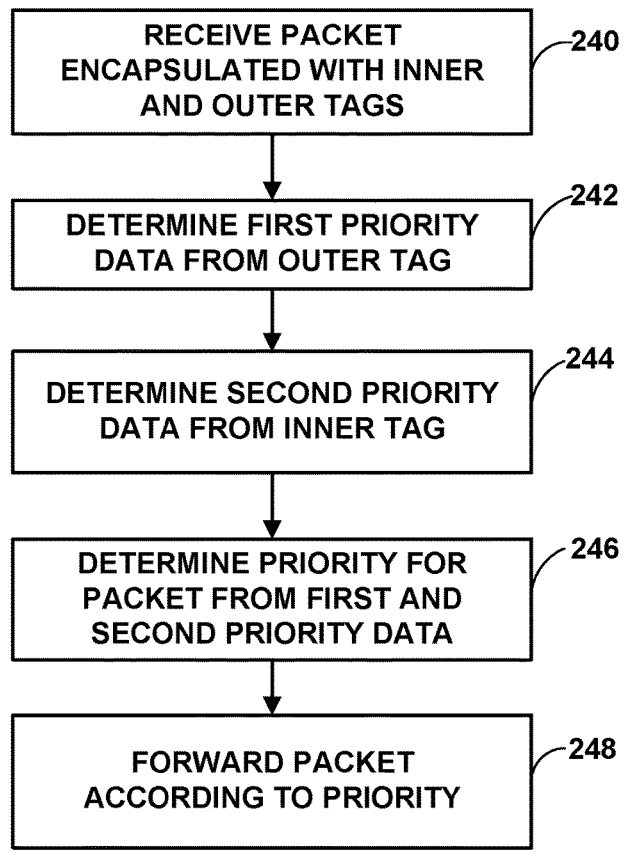
FIG. 5 is a flowchart illustrating an example method for determining a priority for a packet and forwarding the packet based on the priority, in accordance with the techniques of this disclosure.

FIG. 5 is a flowchart illustrating an example method for determining a priority (e.g., a quality-of-service (QoS)) for a packet and forwarding the packet based on the priority, in accordance with the techniques of this disclosure. For purposes of example, the method of FIG. 5 is explained with respect to core router 106. However, it should be understood that other devices may be configured to perform this or a substantially similar method.

Initially, core router 106 receives a packet encapsulated with an inner tag and an outer tag (240). The inner and outer tags may comprise, for example, VLAN tags, IEEE 802.1ah tags, or the like. Furthermore, the inner and outer tags include respective priority fields, each of which is three bits in length (in this example).

Thus, core router 106 determines first priority data from the outer tag (242) and second priority data from the inner tag (244). Core router 106 then determines a priority for the packet from the first priority data and the second priority data (246). For instance, core router 106 may concatenate the data from the priority field of the outer tag and the priority field of the inner tag to form a reproduction of the DSCP data for the packet, and determine the priority of the packet from this reproduced DSCP data.

Core router 106 then forwards the packet according to the determined priority (248). For instance, core router 106 may select one of a plurality of queues in which to enqueue the packet based on the priority for the packet, where the queues are arranged in order based on priorities.

In this manner, the method of FIG. 5 represents an example of a method including receiving, by a network device, an encapsulated packet comprising a first tag having a first priority field and a second tag having a second priority field, and forwarding, by the network device, the encapsulated packet based on the first priority field and the second priority field.

Figure 6:
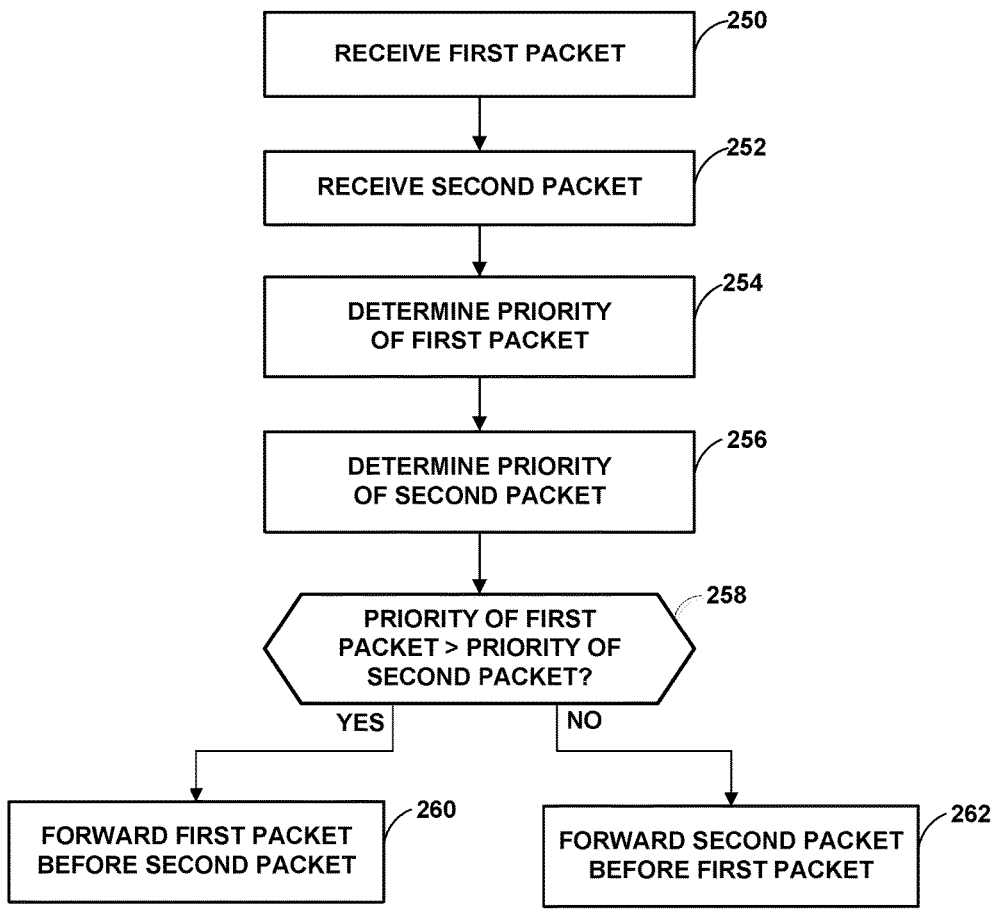
FIG. 6 is a flowchart illustrating an example method for prioritizing one packet over another in accordance with the techniques of this disclosure.

FIG. 6 is a flowchart illustrating an example method for prioritizing one packet over another in accordance with the techniques of this disclosure. Again, for explanatory purposes only, the techniques of FIG. 6 are described with respect to core router 106. The steps of the method of FIG. 6 need not necessarily be performed in the order shown in FIG. 6.

Initially, core router 106 receives a first packet (250) and receives a second packet (252). Core router 106 then determines a priority of the first packet (254) and determines a priority for the second packet (256). Core router 106 may determine the priorities for the first and second packets in accordance with the techniques of FIG. 5, as explained above.

Core router 106 may then determine whether the priority of the first packet is greater than the priority of the second packet (258). In the example of FIG. 6, if the priority of the first packet is greater than the priority of the second packet ("YES" branch of 258), core router forwards the first packet before the second packet (260). On the other hand, if the priority of the first packet is not greater than the priority of the second packet ("NO" branch of 258), core router 106 forwards the second packet before the first packet (262).

It should be understood that an explicit comparison of priorities need not necessarily be performed. Instead, core router 106 may simply determine the respective priorities of the first and second packet, as shown in FIG. 6, and then enqueue the packets in respective queues of a plurality of queues that are arranged according to priority. In this manner, the packet with the highest priority will naturally be forwarded before the packet with the lower priority, without an express need for an explicit comparison of priorities between the two packets. However, in some examples, core router 106 may perform an explicit comparison of the priorities of the two packets.

Again, as noted above, the steps of the method of FIG. 6 need not necessarily be performed in the order shown. For example, core router 106 may receive the first packet and begin processing the first packet (e.g., to determine a priority for the first packet) before receiving the second packet.

In this manner, the method of FIG. 6 represents an example of a method including receiving, by a network device, a first encapsulated packet comprising a first tag and a second tag, receiving, by the network device, a second encapsulated packet comprising a third tag and a fourth tag, determining, by the network device, a first quality of service (QoS) for the first packet using a first priority field of the first tag and a second priority field of the second tag, determining, by the network device, a second QoS for the second packet using a third priority field of the third tag and a fourth priority field of the fourth tag, wherein the second QoS is lower than the first QoS, and based on the second QoS being lower than the first QoS, forwarding, by the network device, the first encapsulated packet before forwarding the second encapsulated packet.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), Flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

The invention claimed is:

1. A method comprising:
   retrieving, by a network device, priority data from an Internet protocol (IP) header of a packet, the priority data comprising a single value;
   partitioning, by the network device, the single value of the priority data into a first portion and a second portion;
   forming, by the network device, a first tag including the first portion of the single value of the priority data in a first priority field of the first tag;
   forming, by the network device, a second tag including the second portion of the single value of the priority data in a second set of data in a second priority field of the second tag;
   encapsulating, by the network device, the packet with the first tag and the second tag to form an encapsulated packet; and
   forwarding, by the network device, the encapsulated packet.

2. The method of claim 1,
   wherein the priority data comprises differentiated services codepoint (DSCP) data, the DSCP data comprising six bits having a first three bits and a second three bits, the first portion comprising the first three bits, and the second portion comprising the second three bits,
   wherein forming the first tag comprises copying the first three bits of the DSCP data into the first priority field, and
   wherein forming the second tag comprises copying the second three bits of the DSCP data into the second priority field, such that when concatenated, the first three bits and the second three bits form the six bits of the DSCP data.

3. The method of claim 1, wherein the first tag comprises an outer tag including data that identifies a customer corresponding to the packet, and wherein the second tag comprises an inner tag including data that identifies one or more services to be applied to the packet based on the customer, and wherein encapsulating comprises:
   encapsulating the packet with the second tag to form an intermediate encapsulated packet; and
   encapsulating the intermediate encapsulated packet with the first tag to form the encapsulated packet.

4. The method of claim 1, wherein the first tag comprises a first virtual local area network (VLAN) tag that conforms to IEEE 802.1Q, and wherein the second tag comprises a second VLAN tag that conforms to IEEE 802.1Q.

5. The method of claim 1, wherein the first tag and the second tag conform to IEEE 802.1ah.

6. A method comprising:
   receiving, by a network device, an encapsulated packet comprising a first tag having a first priority field including a first portion of a single value of priority data for the encapsulated packet and a second tag having a second priority field including a second portion of the single value of the priority data for the encapsulated packet;
   concatenating, by the network device, the first portion of the single value and the second portion of the single value to reproduce the single value of the priority data for the encapsulated packet;
   determining, by the network device, a priority for forwarding the encapsulated packet from the single value relative to one or more other packets having respective priorities; and
   forwarding, by the network device, the encapsulated packet and the one or more other packets in an order indicated by the priority for the encapsulated packet and the respective priorities for the one or more other packets.

7. The method of claim 6, wherein concatenating the first portion and the second portion comprises forming differentiated services codepoint (DSCP) data for the encapsulated packet.

8. The method of claim 6, wherein the first tag comprises an outer tag, and wherein the second tag comprises an inner tag.

9. The method of claim 6, wherein the first tag comprises a first virtual local area network (VLAN) tag that conforms to IEEE 802.1Q, and wherein the second tag comprises a second VLAN tag that conforms to IEEE 802.1Q.

10. The method of claim 6, wherein the first tag and the second tag conform to IEEE 802.1ah.

11. An edge routing device of a service provider network, the edge routing device comprising:
    one or more network interfaces configured to send and receive packets; and
    a processing unit implemented in circuitry and configured to:
      retrieve priority data from an Internet protocol (IP) header of a packet, the priority data comprising a single value;
      partition the single value of the priority data into a first portion and a second portion;
      form a first tag including the first portion of the single value of the priority data in a first priority field of the first tag;
      form a second tag including the second portion of the single value of the priority data in a second set of data in a second priority field of the second tag;
      encapsulate the packet with the first tag and the second tag to form an encapsulated packet; and
      forward the encapsulated packet.

12. The edge routing device of claim 11,
wherein the priority data comprises differentiated services codepoint (DSCP) data, the DSCP data comprising six bits having a first three bits and a second three bits, the first portion comprising the first three bits, and the second portion comprising the second three bits,
wherein to form the first tag, the processing unit is configured to copy the first three bits of the DSCP data into the first priority field, and
wherein to form the second tag, the processing unit is configured to copy the second three bits of the DSCP data into the second priority field, such that when concatenated, the first three bits and the second three bits form the six bits of the DSCP data.

13. The edge routing device of claim 11, wherein the first tag comprises an outer tag including data that identifies a customer corresponding to the packet, and wherein the second tag comprises an inner tag including data that identifies one or more services to be applied to the packet based on the customer, and wherein to encapsulate the packet, the processing unit is configured to:
encapsulate the packet with the second tag to form an intermediate encapsulated packet; and
encapsulate the intermediate encapsulated packet with the first tag to form the encapsulated packet.

14. A core routing device of a service provider network, the core routing device comprising:
one or more network interfaces configured to send and receive packets; and
a processing unit implemented in circuitry and configured to:
receive an encapsulated packet comprising a first tag having a first priority field including a first portion of a single value of priority data for the encapsulated packet and a second tag having a second priority field including a second portion of the single value of the priority data for the encapsulated packet;
concatenate the first portion of the single value and the second portion of the single value to reproduce the single value of the priority data for the encapsulated packet;
determine a priority for forwarding the encapsulated packet from the single value relative to one or more other packets having respective priorities; and
forward the encapsulated packet and the one or more other packets in an order indicated by the priority for the encapsulated packet and the respective priorities for the one or more other packets.

15. The core routing device of claim 14, wherein the processing unit is configured to form differentiated services codepoint (DSCP) data for the encapsulated packet from concatenating the first portion of the single value and the second portion of the single value.

16. A system comprising:
an edge routing device of a service provider network, the edge routing device comprising circuitry configured to:
retrieve priority data from an Internet protocol (IP) header of a packet, the priority data comprising a single value;
partition the single value of the priority data into a first portion and a second portion;
form a first tag including the first portion of the single value of the priority data in a first priority field of the first tag;
form a second tag including the second portion of the single value of the priority data in a second set of data in a second priority field of the second tag;
encapsulate the packet with the first tag and the second tag to form an encapsulated packet; and
forward the encapsulated packet; and
a core routing device of the service provider network comprising circuitry configured to:
receive the encapsulated packet;
concatenate the first portion of the single value and the second portion of the single value to reproduce the single value of the priority data for the encapsulated packet;
determine a priority for forwarding the encapsulated packet from the single value relative to one or more other packets having respective priorities; and
forward the encapsulated packet and the one or more other packets in an order indicated by the priority for the encapsulated packet and the respective priorities for the one or more other packets.

17. A computer-readable storage medium having stored thereon instructions that, when executed, cause a processor of an edge routing device to:
retrieve priority data from an Internet protocol (IP) header of a packet, the priority data comprising a single value;
partition the single value of the priority data into a first portion and a second portion;
form a first tag including the first portion of the single value of the priority data in a first priority field of the first tag;
form a second tag including the second portion of the single value of the priority data in a second set of data in a second priority field of the second tag;
encapsulate the packet with the first tag and the second tag to form an encapsulated packet; and
forward the encapsulated packet.

18. A computer-readable storage medium having stored thereon instructions that, when executed, cause a processor of a core routing device to:
receive an encapsulated packet comprising a first tag having a first priority field including a first portion of a single value of priority data for the encapsulated packet and a second tag having a second priority field including a second portion of the single value of the priority data for the encapsulated packet;
concatenate the first portion of the single value and the second portion of the single value to reproduce the single value of the priority data for the encapsulated packet;
determine a priority for forwarding the encapsulated packet from the single value relative to one or more other packets having respective priorities; and
forward the encapsulated packet and the one or more other packets in an order indicated by the priority for the encapsulated packet and the respective priorities for the one or more other packets.

\* \* \* \* \*